A. F. FIFIELD

RAIL ANCHOR

Feb. 3 1931. Re. 17,952

Original Filed Sept. 16, 1929

Inventor

Albert F. Fifield

By Slough & Canfield

His Attorneys

Reissued Feb. 3, 1931

Re. 17,952

UNITED STATES PATENT OFFICE

ALBERT F. FIFIELD, OF ST. CATHARINES, ONTARIO, CANADA, ASSIGNOR TO THE AMERICAN FORK & HOE COMPANY, OF CLEVELAND, OHIO, A CORPORATION OF OHIO

RAIL ANCHOR

Original No. 1,777,840, dated October 7, 1930, Serial No. 392,868, filed September 16, 1929. Application for reissue filed December 12, 1930. Serial No. 501,995.

My invention relates to rail anchors and relates particularly to rail anchors of the general type having a rail base gripping element and a reach bar projected therefrom transversely and beneath the rail base to engage the opposite rail base edge to lock the anchor on the rail.

This invention has for a general object the improvement of that type of rail anchor characterized by its being constructed in two interlocking parts of which one may be termed a clamp and the other a clip, the clip making wedging engagement with the clamp to cooperate therewith to lock the anchor on the rail.

An object of my invention is to provide a highly efficient form of anchor which may be advantageously manufactured in quantities at small cost.

Another object of my invention is to provide a two piece anchor employing a rigid clamp and resilient clip, the clamp being formed from sheet metal yet being very rigid and substantially non-distortable, reliance being substantially entirely had on the resiliency of the clip to provide such yielding as is required during application and use.

Another object of my invention is to provide an improved two piece rail anchor of a highly efficient form.

Another object of my invention is to provide an improved two piece rail anchor comprising a clamp and clip, the clip being adapted to be removed and another clip of the same kind substituted but of a different size to accommodate rail bases of different sizes.

Other objects of my invention and the invention itself will become apparent by reference to the following description of an embodiment of my invention which is illustrated in the accompanying drawings, in which:—

Figure 4:
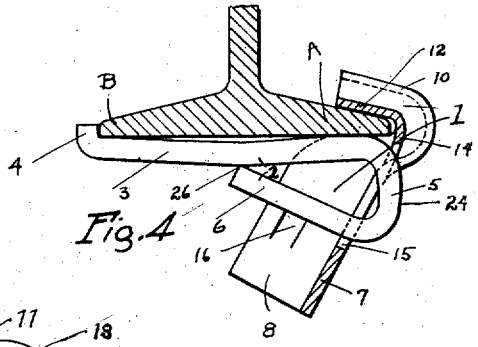
Fig. 4 is a section taken on the line 4—4 of Fig. 2.
Figure 5:
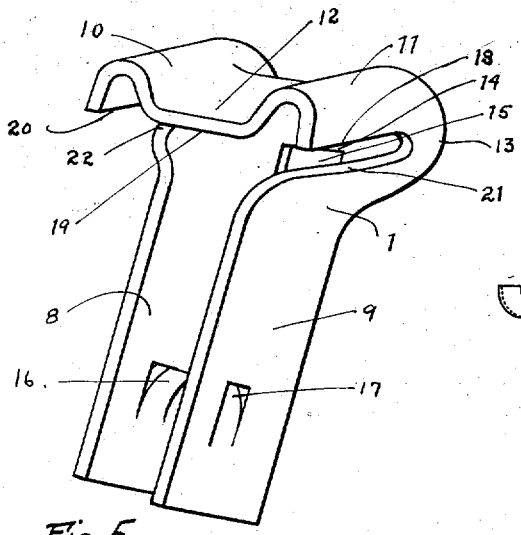
Fig. 5 is a perspective view of the substantially rigid clamp employed in the said anchor.
Figure 6:
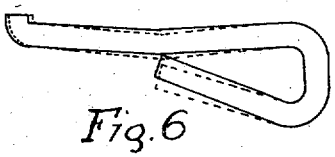
Fig. 6 is a side elevational view of the relatively resilient clip employed in connection with the clamp of Fig. 5 to form the complete rail anchor of the other figures.

Referring now to all of the figures of drawing in all of which like parts are designated by like reference characters, I show generally at 1 in Figs. 1 to 4 and in Fig. 5 a relatively rigid clamp made of sheet steel being formed from a single blank to cause it to take the form illustrated in the figures. At 2, I show the relatively resilient clip which is formed from a single length of bar steel, as by successive cutting and forging operations. The clip 2 preferably comprises a reach arm 3 terminating at one end in an up-turned hook 4 and at the other end in a loop 5, the loop being formed by reversely turning a relatively short arm 6 toward the intermediate portion of the reach arm 3, forming the other arm of the loop. The loop is normally open and adapted to be closed by the converging of the short arm toward the intermediate portion of the long or reach arm.

The clamp is in the form of a pierced channel having a rear wall 7 and side walls 8 and 9. The upper end of the clamp is folded at a substantially acute angle to the pendant portion extending over and beyond the side walls 8 and 9 of the channel, whose upper portions are deflected outwardly and curvilinearly to merge with the top portion of the clamp, which is in the form of a pair of spaced longitudinally extending arches 10 and 11, interiorly joined by a depressed longitudinally extending trough portion 12.

Thus, there is given to the upper part of the clamp a substantially M-form in transverse sections with an outward and rearward bulging of the curvilinearly formed portions 13, joining the pendant channel with the upper part of the clamp, the rear wall of the clamp comprising the rear channel wall 7 and the rear end 14 of the joining part 13 is provided with a preferably rectangular aperture 15 extending downwardly from the wall 12 of the said intermediate trough portion of the clamp to substantially below the middle of the rear channel wall 7.

Somewhat above the level of the lower edge of the aperture 15 tongues 16 and 17 are projected inwardly from the material of the side channel walls 8 and 9 of the channel toward each other, as to form shelf elements.

Figure 1:
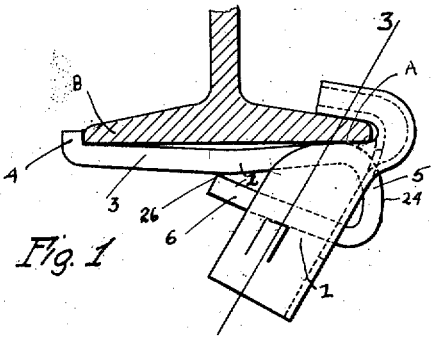
Fig. 1 is a view in side elevation of my improved anchor applied to a rail base shown in section.
Figure 2:
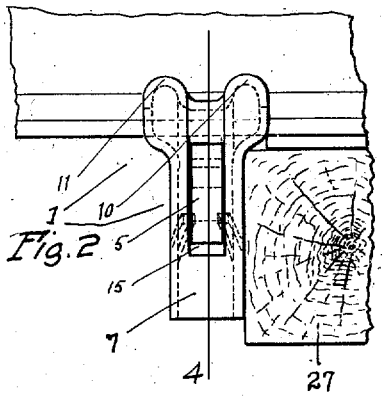
Fig. 2 is an end elevational view of the rail and attached anchor of Fig. 1.
Figure 3:
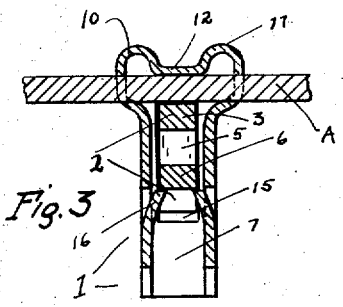
Fig. 3 is a section taken on the line 3—3 of Fig. 1.

The lower-most surface of the said forwardly deflected upper part of the clamp comprises the parts 10, 11 and 12 forming spaced jaw portions 18, 19 and 20 engageable with the upper surface of a rail base flange A onto which the clamp may be driven as illustrated in Fig. 1, the upper edge portions 21 and 22 of the said joining parts of the clamp, which are upwardly and outwardly extending portions of the channel walls 8 and 9, forming a pair of spaced lower jaw elements engageable with the bottom surfaces of the said rail base flange.

Thus, the blank 1 is adapted to be driven onto a rail base flange, the ancillary spaced jaw elements 20, 19 and 18 engaging the top of the rail base flange while the ancillary spaced jaws 21 and 22 engage the bottom surface of the rail base flange A as best shown in Fig. 4, these opposing sets of jaws defining a tapered jaw opening adapted to rigidly secure the rail base flange between the sets of jaws.

The material of the clamp and the disposition of the material is such that a slight amount of yielding may be accomplished as may be necessary to insure a tight fit of the clamp onto the rail base flange.

The clip is adapted to be projected through the aperture 15 and over the shelf elements 16 and 17, which are engaged by the short arm 6 of the clip, the hooked end 4 of which being projected foremost until it is brought into engagement with the under surface of the base of the rail between which and the shelf elements the loop 5 by its long and short arms will make wedging engagement.

Such insertion of the clip through the clamp will preferably be made after the clamp has been driven onto the rail base flange which it grips by its opposing sets of jaws above described.

The clip is now driven home by striking the end 24 of the loop with a maul or other implement, compression of the loop 5 resulting while the hook 4 is advanced to the other side of the rail until it reaches a position where it will snap upwardly into abutting lateral engagement with the lateral surface of the rail base flange B.

The rail base is now tightly gripped by the opposing jaws of the clamp which embrace the rail base flange 23 and the shoulder 4 at the end of the clip engaging the lateral surface of the flange B.

When in position, the reach arm 3 of the clip is forced to take a less bowed form, being straightened somewhat by the upward pressure of the end 26 of the short arm 6 against its underside, the short arm being supported in reach arm supporting position, meanwhile, by the shelf elements 16 and 17 and retained in such position by the engagement of the shoulder 4 with the rail base flange.

The width of the aperture 15 and the spacing between the walls 8 and 9 of the clamp is just enough greater than the width of the bar forming the clip, that the clip may be readily inserted through the clamp but, and at the same time are adapted for engagement with both sides of the clip to prevent rotational movement tending to displacement of the clip.

Either of the outer lateral surfaces of the clamp walls 8 or 9 is adapted for engagement by a rail tie shown at 27 to form an abutment for the anchor to prevent longitudinal displacement of the rail relative to such tie or other fixed portion of the railroad bed which it abuts.

Having thus described my invention in certain embodiments, I am aware that numerous and extensive departures may be made from the embodiment illustrated and described herein, but without departing from the spirit of my invention.

I claim:

1. In a two piece rail anchor the combination with a clamp and a clip, said clip comprising a rearmost resiliently compressible wedge shaped portion, widest at its rear end and a forwardly extending resilient reach member, said reach member terminating at its forward end in an up-turned hook to form a rail flange edge surface abutting element, said clamp comprising a pair of jaws adapted to be driven onto and to embrace the other rail base flange and having a pendant portion of channel form, the side walls of the channel both projected inwardly beneath the rail base and the rear wall being apertured, said clip adapted for projection through said aperture with its hooked end foremost and shelf means associated with said channel side walls engageable with the lower surface of the wedge portion of said clip.

2. A two piece rail anchor comprising a generally channel shaped clamp bent inwardly to provide two relatively angularly disposed portions, the side walls bulging outwardly at the point of junction of the portions, curvilinearly and the edges of the lower part of said portions forming jaws adapted for engagement with the bottom surface of a rail base flange, the edges of an upper one of said angularly disposed portions cooperating with said jaws to form a set of jaws and engageable with the upper surface of said rail base flange, the other angularly disposed portion being pendant from the first portion of said jaws and adapted for disposition below a rail base onto which said other portion by its jaws is driven and a resilient clip interlockingly engageable with said clamp and adapted for deformation to extend it into hooked engagement with an opposite rail base flange, said rail base being compressively gripped by cooperative compressive action of said clip and said clamp.

3. A two piece rail anchor comprising a channel shaped clamp having two portions relatively angularly disposed at an acute angle with the lateral channel walls inwardly disposed, the edges of the walls of one of said portions forming an upper surface of a rail base flange and edges of the channel walls forming a continuation of said jaws being inturned to engage the bottom surface of the rail base flange and angularly merging with the edges of the other channel shaped portion pendantly disposing relatively thereto and a resilient strip comprising a hook at its forward end and a loop at its rearward end, said loop adapted for interlocking engagement with the clamp and adapted to be deformed by a driving operation effecting projection of the clip with its hooked end foremost through the clamp, said hook adapted to be resiliently snapped over the lateral edge of the opposite rail base flange as a result of the resilient distortion of the loop, said clamp comprising a portion resisting distortion of the loop and effecting a storage of energy communicated to the loop by driving therein to resiliently maintain the clip and clamp in grip engagement with the opposite rail base flange.

4. A two piece rail anchor comprising a trough shape clamp bent intermediate its ends to form opposing rail base flange enveloping jaws and pierced below the jaws, and a resilient clip comprising a portion adapted to be driven into the pierced clamp below the rail base and provided with a tongue having an upturned free end adapted to be snapped over the edge of the opposite rail base flange when the clip is driven into the clamp with the clamp in position on a rail base flange.

5. A two piece rail anchor, comprising a trough shaped clamp bent intermediate its ends to form by opposed side edges, opposing rail base clamp receiving jaws, said clamp having an apertured rear wall and a resilient clip comprising a looped portion and a tongue projecting from an arm thereof having an upturned free end adapted to be projected through the clamp aperture and to snap said end over the edge of the opposite rail base flange when the clip is driven into the clamp and the clamp positioned on a rail base flange.

6. A two piece rail anchor, comprising a sheet metal trough shaped clamp bent intermediate its ends to form by opposed side edges, opposing pairs of jaws adapted to fit onto a rail base flange received between them, said clamp having an apertured rear wall and inwardly projecting tongues extending from the lateral sides of the clamp below the aperture, and a resilient clip comprising a looped portion and a tongue projecting from an arm thereof having an upturned free end adapted to be projected through the clamp aperture, and to snap said end over the edge of the opposite rail base flange when the clip is driven into the clamp and the clamp positioned on a rail base flange, said loop being maintained under compressive stress intermediate said inwardly projecting tongues and the bottom of the rail base.

7. A two piece rail anchor comprising a clamp having two separate pairs of jaws adapted to be driven onto a rail base flange, said pairs of jaws being relatively spaced longitudinally of the rail base, and a pair of substantially parallel sheet metal elements pendantly integrally supported by said clamp below the rail base, each of said elements provided with an integrally formed inwardly extending projection, both projections substantially spaced below the rail base, and a resilient clip comprising a resilient loop having a long and a short arm, the short arm converging toward an intermediate portion of the long arm, said long arm having an upturned free end, said clip adapted to be projected between said pendant sheet metal elements below the rail base and over said inward projections, its free end adapted to be snapped over the edge of the opposite rail base flange when the clip is driven transversely of the rail base, said loop being maintained under compressive stress exerted upon it by the bottom of the rail base and said pair of inward projections, upon which a short arm of said loop is seated.

In testimony whereof I hereunto affix my signature this 1st day of December, 1930.

ALBERT F. FIFIELD.